United States Patent [19]

Kramell

[11] 3,825,686

[45] July 23, 1974

[54] TELEPHONE HANDSET VIBRATOR

[75] Inventor: Hans Peter Kramell, Perry, N.Y.

[73] Assignee: Xerox Corporation, Stamford, Conn.

[22] Filed: Mar. 19, 1973

[21] Appl. No.: 342,639

[52] U.S. Cl. .................... 179/1 C
[51] Int. Cl. .................... H04m 1/64
[58] Field of Search ......... 179/1 C, 2 C, 6 AC, 122, 179/187, 129; 310/12

[56] References Cited

UNITED STATES PATENTS 553,843 2/1896 Dinsmore .................... 179/129
3,585,302 6/1971 Swan .................... 179/1 C

*Primary Examiner*—Kathleen H. Claffy
*Assistant Examiner*—Douglas W. Olms

[57] ABSTRACT

Apparatus for loosening the carbon which becomes packed in the transmitter of a telephone handset remaining at rest in an acoustic coupler for extended periods of time. A weighted arm is thrown against the coupler boot by a solenoid push rod.

3 Claims, 5 Drawing Figures

TELEPHONE HANDSET VIBRATOR

BACKGROUND OF THE INVENTION

This invention relates to telephone handset acoustic couplers and, more particularly, to apparatus for preventing packing of the carbon granules in a telephone transmitter at rest in an acoustic coupler.

The use of acoustic couplers to connect data transmission and/or receiving terminal equipments to the telephone network has in recent years become quite widespread. In particular, the use of acoustic couplers in cooperation with facsimile transceivers is very popular. This allows for the portability of these transceivers, such as the 400 Telecopier facsimile transceiver manufactured by Xerox Corp. In the past, the telephone handset was usually moved into and out of the coupler every time the terminal equipment was used. However, with the advent of more automatic devices, such as the UNA telephone answering accessory manufactured by Xerox Corporation, the telphone handset may remain at rest in the acoustic coupler for extended periods of time. Studies have shown that if a telephone handset lays at rest for a long period of time, the carbon granules in the transmitter of the handset will tend to become packed. This packing creates a decrease in the amplitude of the audiofrequency current waveform transmitted over the telephone network, along with distortion of the transmitted signal. It would therefore be desirable to have some means for preventing this packing of carbon granules in the telephone handset while allowing the handset to remain at rest for extended periods of time. A similar packing problem was noted when telephone transmitters were wall-mounted. U.S. Pat. No. 553,452 (Jan. 21, 1896) and U.S. Pat. No. 553,843 (Feb. 4, 1896) disclose apparatus for rotating the transmitter each time a call is made or received. However, this prior disclosed apparatus is internal to the telephone and has no application to a telephone handset at rest in an acoustic coupler.

SUMMARY OF THE INVENTION

In accordance with the principles of this invention, apparatus is provided for automatically vibrating the telephone handset transmitter in order to prevent the packing of the carbon granules therein. Below the transmitter coupler boot, a hinged weighted arm rests on top of a push solenoid. When the push solenoid is energized, the arm is thrown against the coupler boot holding the transmitter, thereby causing the carbon granules in the transmitter to be vibrated and unpacked.

DESCRIPTION OF THE DRAWING

The foregoing will become more readily apparent upon reading the following description in conjunction with the drawings in which.

DESCRIPTION OF THE ILLUSTRATIVE EMBODIMENT

Figure 2:
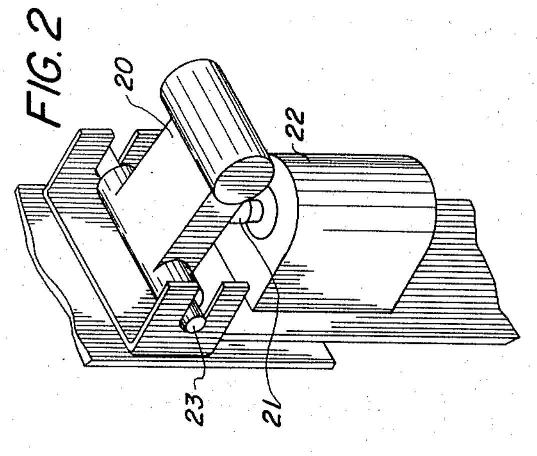
FIG. 2 depicts a perspective view of an illustrative solenoid and arm utilized in the apparatus of FIG. 1, and FIGS. 3(*a*) through 3(*c*) depict side elevations of the apparatus of FIG. 2 showing the sequence of operation of the illustrative apparatus.
Figure 1:
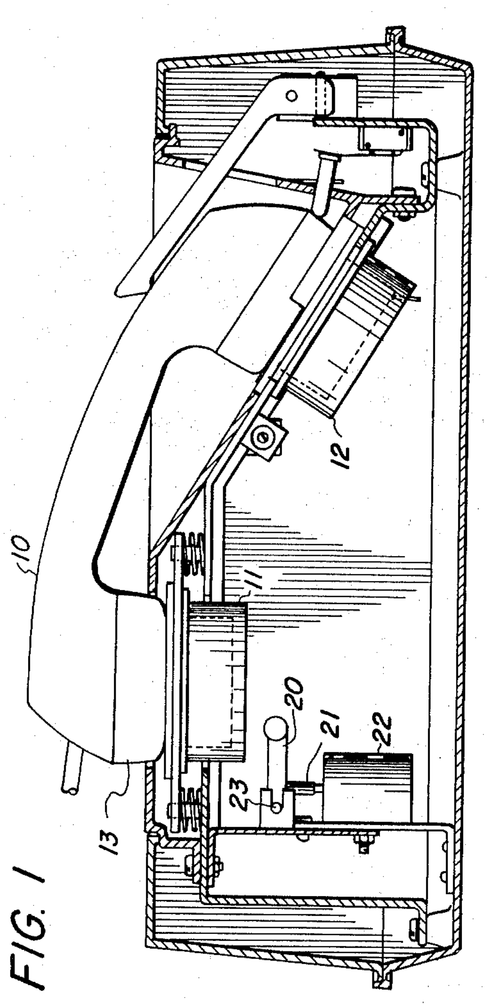
FIG. 1 depicts illustrative apparatus embodying the principles of this invention.

Turning now to FIG. 1, depicted therein is a telephone handset 10 resting on an acoustic coupler of an illustrative facsimile transceiver. The acoustic coupler is illustratively of the type described in U.S. Pat. No. 3,592,966, and comprises coupler boots 11 and 12. Coupler boot 11 contains therein the transmitting transducer and coupler 12 contains the receiver transducer. Within the handset 10 is transmitter 13 which rests on top of coupler boot 11. Below coupler boot 11 is weighted arm 20 which rests upon rod 21 of push solenoid 22 under the influence of gravity. Arm 20 is pivoted about point 23 and its free end is arranged to be more heavily weighted than the remainder of the arm. FIG. 2 shows a perspective view of an illustrative arm 20 pivotable about point 23 and resting on rod 21 of solenoid 22.

Figures 3A, 3B, 3C:
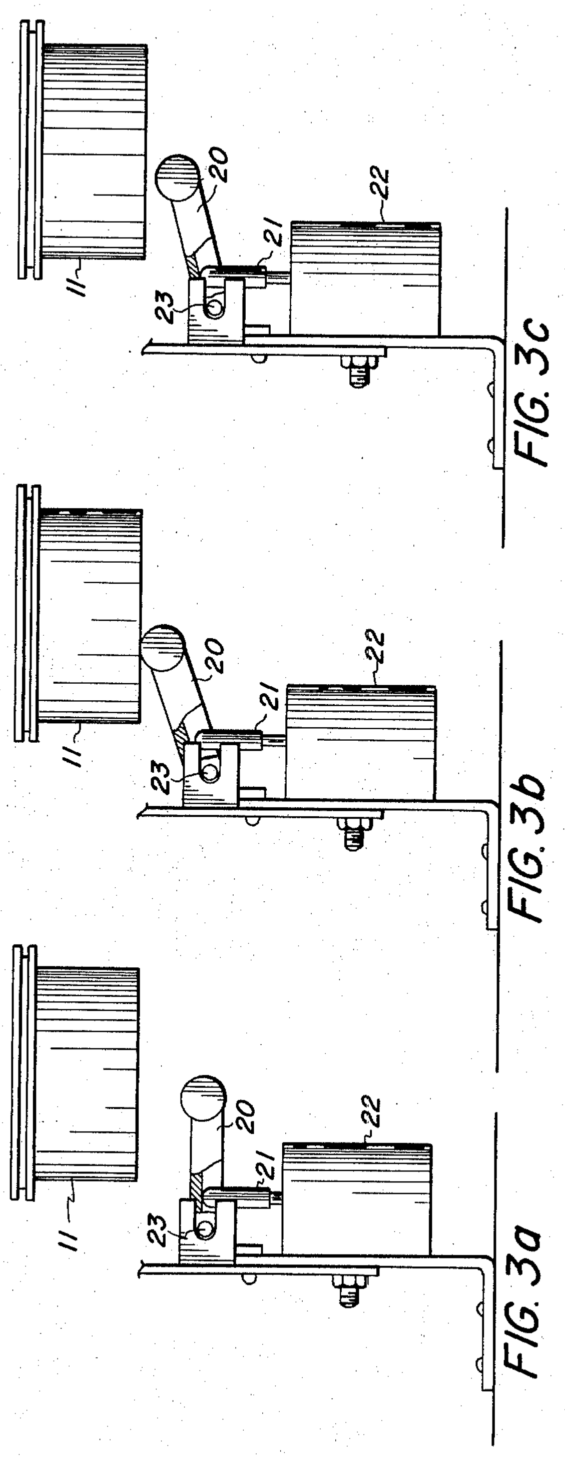

Arm 20 and solenoid 22 are positioned with respect to coupler boot 11 so that the distance between arm 20 and boot 11 when solenoid 22 is not energized is greater than the upward thrust of push rod 21 when solenoid 22 is energized. As is shown in greater detail in FIGS. 3(*a*) through 3(*c*), when solenoid 22 is not energized arm 20 rests upon rod 21 (FIG. 3(*a*)). When solenoid 22 is energized, rod 21 extends upward, imparting a thrust to arm 20 which propels the free end of arm 20 into contact with boot 11 (FIG. 3(*b*)). When the free end of arm 20 strikes boot 11, the impact is transmitted to transmitter 13, vibrating and loosening the carbon granules therein. Arm 20 then falls back onto extended rod 21 and remains out of contact with boot 11 (FIG. 3(*c*)).

In order to assure maximum transmission efficiency, it is desirable to energize solenoid 22 prior to each transmission. The length of time that solenoid 22 is energized is of no significance so far as the principles of this invention are concerned since arm 20 only makes a single contact with boot 11. Therefore, if used in a device such as the 400 Telecopier facsimile transceiver manufactured by Xerox Corp., solenoid 22 may be energized, for example, for the 15 second phasing interval. If used in conjunction with apparatus described in copending application Ser. No. 253,721, filed May 16, 1972, and assigned to the Assignee of the present invention, wherein an automatic facsimile transceiver unit is shown, solenoid 22 may be energized whenever paper feed clutch 60 of the aforementioned patent application is energized.

Accordingly, there has been shown apparatus for preventing the packing of carbon granules in a telephone transmitter handset which is at rest in an acoustic coupler for extended periods of time. Numerous other variations, modifications and adaptations of the present invention will be apparent to those skilled in the art and such as come within the spirit and scope of the appended claims are considered to be embraced by the present invention. For example, an alternate arrangement would have solenoid 22 above arm 20 and rod 21 moving downward when solenoid 22 is energized. With such an arrangement, arm 20 would extend past pivot point 23 and this extension would be in contact with rod 21.

What is claimed is:

1. Apparatus for vibrating the transmitter of a telephone handset in contact with an acoustic coupler boot containing a transmitting transducer so as to loosen the carbon granules in said transmitter, said apparatus comprising a solenoid having a rod adapted to extend out from said solenoid when said solenoid is energized, and A pivotably mounted arm having one end free to move against said boot, said arm contacting said solenoid rod under gravitational influence, said arm and said solenoid being positioned so that said free end of said arm strikes said boot when said solenoid is energized and said arm then falls back on said extended rod.

2. The apparatus of claim 1 wherein said arm is more heavily weighted at said free end than at the other end of said arm.

3. The apparatus of claim 2 wherein said solenoid rod contacts said arm at a point between said free end of said arm and the pivot point of said arm.

* * * * *